(12) United States Patent
Sugiyama

(10) Patent No.: US 6,306,343 B1
(45) Date of Patent: Oct. 23, 2001

(54) PHOTOCATALYST HAVING VISIBLE LIGHT ACTIVITY AND USES THEREOF

(75) Inventor: Kazuo Sugiyama, Tokyo (JP)

(73) Assignee: Ecodevice Laboratory Co., LTD (JP)

( * ) Notice: Subject to any disclaimer, the term of this patent is extended or adjusted under 35 U.S.C. 154(b) by 0 days.

(21) Appl. No.: 09/308,780

(22) PCT Filed: Nov. 18, 1997

(86) PCT No.: PCT/JP97/04191

§ 371 Date: Jul. 26, 1999

§ 102(e) Date: Jul. 26, 1999

(87) PCT Pub. No.: WO98/23374

PCT Pub. Date: Jun. 4, 1998

(30) Foreign Application Priority Data

Nov. 25, 1996 (JP) .................................................. 8-313598
Feb. 20, 1997 (JP) .................................................. 9-036300
Jun. 6, 1997 (JP) .................................................. 9-149538

(51) Int. Cl.$^7$ ........................................................ A61L 9/00
(52) U.S. Cl. ............................... 422/4; 422/5; 423/210; 423/245.1
(58) Field of Search .......................... 422/4, 5, 120, 422/121, 122; 502/5, 177, 350; 423/210, 245.1

(56) References Cited

U.S. PATENT DOCUMENTS 3,865,750  2/1975  Rase et al. .

FOREIGN PATENT DOCUMENTS

| 0 725 036 B1 | 8/1999 | (EP) . |
| 8-134630 | 5/1996 | (JP) . |
| 8-208211 | 8/1996 | (JP) . |
| 8-332378 | 12/1996 | (JP) . |

OTHER PUBLICATIONS

Ku, Su–Jin et al. "Synthesis of diamond–like carbon films on a TiO2 substrate by DC–discharge plasma enhanced chemical vapor deposition," Bull. Korean Chem. Soc. (1995), 16(9), pp. 813–818. (ABSTRACT).*

English abstract of JP 59 203701, Database WPI, Section CH, Week 198501, Derwent Publications Ltd. XP 002132497.

English Abstract of Japanese 08134630, May 1996.

English Abstract of Japanese 08332378, Dec. 1996.

* cited by examiner

Primary Examiner—Elizabeth McKane
(74) Attorney, Agent, or Firm—Burns, Doane, Swecker & Mathis, L.L.P.

(57) ABSTRACT

A photocatalyst with visible light activity in which TiC is supported at least partially on a surface of $TiO_2$ is claimed. This is obtained by subjecting $TiO_2$ to a CVD treatment in a plasma with a mixed gas of hydrocarbon and methane. A method for decomposing material wherein a material to be decomposed such as formaldehyde is made in contact with the above-mentioned catalyst to which light including at least visible ray is radiated. According to the present invention, a photocatalyst with visible light activity capable of making harmless organic compounds such as formaldehyde, a method for making harmless organic compounds such as formaldehyde by the use of the photocatalyst and a method for photo-decomposition of organic compounds such as tar are provided.

15 Claims, 7 Drawing Sheets

XPS SPECTRA OF SAMPLES
(a) UNTREATED
(b) PLASMA TREATED

PHOTOCATALYST HAVING VISIBLE LIGHT ACTIVITY AND USES THEREOF

TECHNICAL FIELD

This invention relates to a photocatalyst with visible light activity and a method for photo-decomposition in use of this photocatalyst and light including visible light.

BACKGROUND TECHNOLOGY

Deodorizing and sterilizing in use of photocatalysts has been researched in various ways, and some is used actually. For example, WO 94/11092 discloses an air treatment method using photocatalysts under indoor illumination. Japanese Unexamined Patent (KOKAI) Publication Heisei No. 7-102,678 discloses a method for preventing intra-hospital infection using photocatalysts. Each method uses oxide semiconductors such as titanium oxide as a photocatalyst, which needs ultraviolet ray having wavelength 400 nm or less as the excitation light.

Meanwhile, solar light or artificial light used as the exciting light source contains visible light in addition to the ultraviolet ray. The photocatalyst made of an oxide semiconductor such as titanium oxide, however, does not use the visible light, and efficiency of energy conversion is very poor.

Due to remarkable development of the chemical industry, various chemical substances exist widely in living environments, and human bodies are adversely and invisibly affected where those chemical substances exist in living space even in a quite small amount. For example, formaldehyde is utilized as a sterilant or insecticide and used as an adhesive for wall paper, furniture, and clothes. In a living environment with a poor air ventilation, the formaldehyde evaporated from the wall paper or the like, for example, may adversely affect human bodies, particularly, bodies of infants.

To remove organic compounds such as formaldehyde or the like existing in the living environment in a small amount, an absorbent or the like may be used. Such absorbent, however, cannot be said as adequately useful in terms of period for use and absorbing performance.

Therefore, a new technology has been expected to further effectively remove formaldehyde or the like existing in a living environment in a very small amount.

Tar produced from tobaccos may adhere to, e.g., walls, lamps, and windows and impair those appearances. Such tar had been removed so far by washing or the like, but such works are too laborious. Therefore, a new technology has been expected to easily remove such tar or the like adhering to, e.g., walls, lamps, and windows.

It is a first object of the invention to provide a new photocatalyst capable of using visible light.

It is a second object of the invention to provide a photocatalyst rendering some organic compounds such as a formaldehyde harmless and a method for rendering such organic compounds such as a formaldehyde harmless using the photocatalyst.

It is a third object of the invention to provide a method for removing various substances including organic materials such as tar upon photo-decomposition using the above photocatalyst.

SUMMARY OF THE INVENTION

This invention relates to a photocatalyst with visible light activity in which TiC is supported at least partially on a surface of $TiO_2$.

The photocatalyst of the invention is characterized in consisting of $TiO_2$ subjected to a CVD treatment with a mixed gas of a hydrocarbon and a reducing agent in plasma and is photoactive.

This invention also relates to a photocatalyst unit characterized in supporting the invented catalyst on a substrate.

Moreover, the invention relates to a method for manufacturing the invented photocatalyst of visible light excitation type characterized in that TiC is supported at least partially on a surface of $TiO_2$, wherein $TiO_2$ powders or $TiO_2$ fixed on a substrate is treated with a plasma mixed gas of hydrocarbon and reducing agent.

This invention also relates to a decomposing method for substances characterized in contacting materials to be decomposed with the invented photocatalyst or the catalyst layer of the photocatalyst unit to which light including at least visible ray is radiated.

This invention further relates to a decomposing method for formaldehyde characterized in contacting formaldehyde with the invented photocatalyst or the catalyst layer of the photocatalyst unit to which light including at least visible ray is radiated.

In addition, this invention is an apparatus including the invented photocatalyst unit, and the apparatus can be selected from a group of a water cleaning apparatus, an air cleaning apparatus, a sterilizing apparatus, a deodorizing apparatus, an illuminating apparatus, a photoelectric cell, and a photolyzing apparatus for water.

EMBODIMENT FOR USING THE INVENTION

Figure 1:
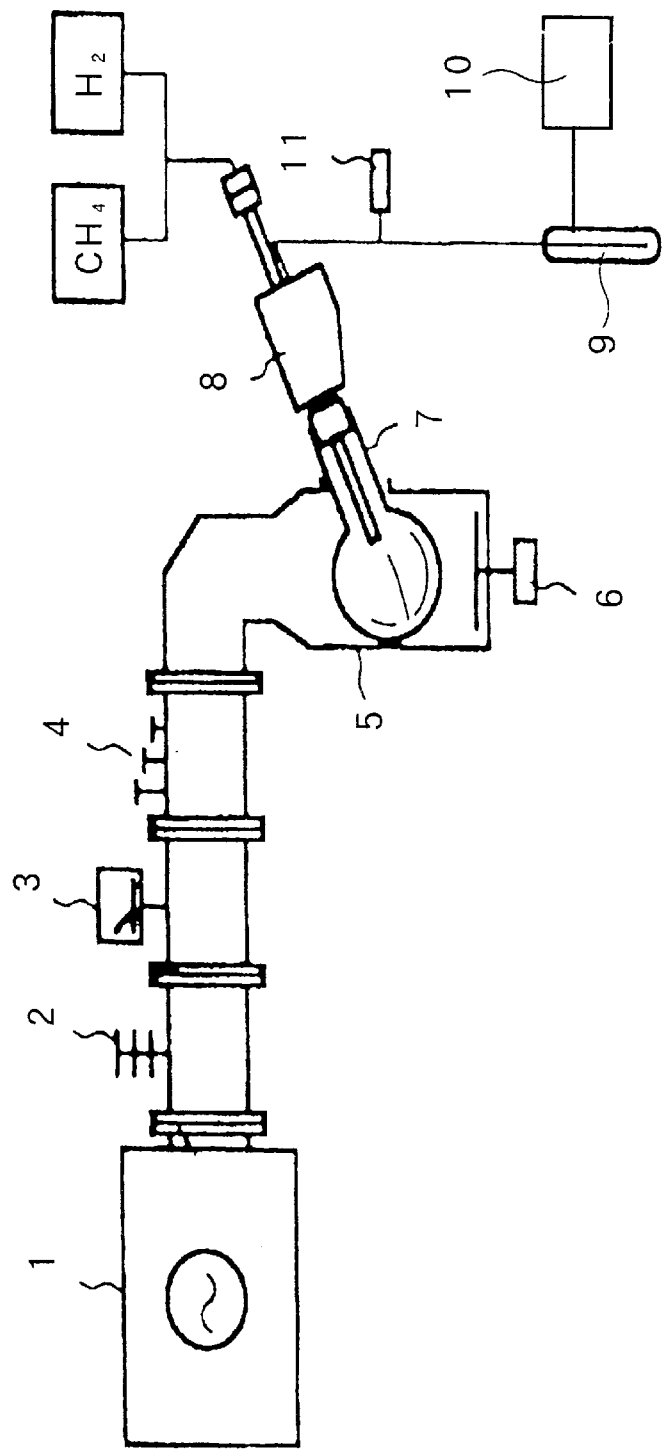
FIG. 1 is an illustration of a microwave plasma heating apparatus used for this invention.

A photocatalyst with visible light activity according to the invention is that TiC is supported at least partially on a surface of $TiO_2$, which can be obtained, e.g., by a CVD treatment for $TiO_2$ using, in plasma, a mixed gas of a hydrocarbon and a reducing agent. A suitable supported amount of the TiC on the surface of the $TiO_2$ is, in consideration of activity of the resultant photocatalyst, in a range of 100:1 to 50 as a ratio of a peak height at 458.5 eV for bound energy of Ti2p3/2 belonging to $TiO_2$ to a peak height at 455 eV belonging to TiC, in terms of bond energy spectrum obtained from an X ray photoelectron spectroscopy, for the benefits of photoactivity with visible light. A further suitable supported amount of the TiC is in a range of 100:1 to 20 as a ratio of a peak height at 458.5 eV to a peak height at 455 eV. It is to be noted that the supported amount of TiC and the photoactivity with visible light and ultraviolet ray are correlative to each other, and it is preferable to change the supported amount of the TiC according to the desired properties.

The photocatalyst with visible light activity according to the invention supports the TiC at least partially on the surface of the TiO$_2$, and has a Raman absorption of 0 to 1000 cm$^{-1}$ belonging to the TiO stretching vibration and the O—Ti—O bending vibration, or has no such a Raman absorption but has a Raman absorption of 3000 to 3500 cm$^{-1}$ belonging to the TiC. Where the photocatalyst has a Raman absorption existing between 0 and 1000 cm$^{-1}$ belonging to the TiO stretching vibration and the O—Ti—O bending vibration, the photocatalyst has a feature that its absorption intensity is weak in comparison with TiO$_2$ without the CVD treatment. For example, the Raman absorption intensity existing between 0 and 1000 cm$^{-1}$ belonging to the TiO stretching vibration and the O—Ti—O bending vibration is one fifth or less of the intensity for TiO$_2$ without the CVD treatment. With the photocatalyst of the invention, where a Raman absorption of 0 to 1000 cm$^{-1}$ belonging to the TiO stretching vibration and the O—Ti—O bending vibration exists, the intensity is stable on a time basis, and if no absorption exists, a Raman absorption belonging to the TiO stretching vibration and the O—Ti—O bending vibration may not occur as time passes and never has the same level of the intensity as the untreated TiO$_2$. The phrase "stable on a time basis" is herein indicates that no substantial change is found in the Raman absorption intensity at least for a month even if the material is left in open air.

The photocatalyst according to the invention, preferably, has a Raman absorption intensity existing between 0 and 1000 cm$^{-1}$ belonging to the TiO stretching vibration and the O—Ti—O bending vibration, which is stable on a time basis, one fifth or less of the intensity of TiO$_2$ without the CVD treatment, and is a substance having a ratio of a peak height at 458.5 eV for bound energy of Ti2p3/2 to a peak height at 455 eV belonging to the TiC, obtained from X ray photoelectron spectroscopy, in a range of 100:1 to 50.

In another aspect of the invented photocatalyst, heat generation is observed caused by reaction of TiC to TiO$_2$ in a temperature range exceeding at least 700° C. in a differential thermal analysis (DTA). TiC changes to TiO$_2$ according to the following reaction formula when heated in air.

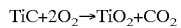

TiC+2O$_2$→TiO$_2$+CO$_2$

The thermal behavior of the above reaction may vary depending on particle size, surface condition, and the like of specimens as subject matters for analysis, and temperature increase rate of the differential thermal analysis (DTA), and generally, such behavior starts at around 300° C., becomes remarkable around 500° C., and goes on up to a temperature range around 1000° C. When a reagent of TiC is examined with a differential thermal analysis (DTA), there is a heat generation peak around 500° C., and the reagent further indicates another heat generation in a region exceeding 700° C. The heat generation in the region exceeding 700° C., particularly, is outstandingly large. On the other hand, where the photocatalyst of this invention is examined by the differential thermal analysis (DTA), almost no heat generation is observed at 500° C. where the analysis has a lower sensitivity, because an amount of TiC in the specimen is relatively small (the majority portion is TiO$_2$). However, some heat generation can be observed in a region exceeding 700° C.

In another aspect of the invented photocatalyst, increased weight caused by reaction of TiC to TiO$_2$ is observed in a temperature range at least exceeding 500° C. in a thermal gravimetric analysis (TGA). Where the reagent of TiC is examined by a thermal gravimetric analysis (TGA), the weight begins to increase at about 300° C. according to the above reaction, and such increase of the weight is clearly observed from the temperature around 500° C. In the region exceeding 700° C., particularly, since the reaction proceeds quickly, the weight increases so much. On the other hand, where the photocatalyst according to the invention is examined by the thermal gravimetric analysis (TGA), the weight increases slightly because the TiC amount is relatively small in the specimen, and where the sensitivity is low, increased weight of an almost negligible degree only is observed. However, where the sensitivity is high, increased weight can be observed. The TiC supported on the surface of TiO$_2$ may be quantitatively determined to some extent from this increase of the weight. Moreover, since there is correlation between an amount of the supported TiC and the visible light and ultraviolet ray photoactivities, and since it is desirable to change an amount of the supported TiC according to the targeted property, the supported amount of TiC can be adjusted based on the consequence of the thermal gravimetric analysis (TGA).

The photocatalyst of the invention, more specifically, can be produced by placing a container containing TiO$_2$ powders or TiO$_2$ fixed on a substrate under atmospheric pressure or reduced pressure and supplying a mixed gas of a hydrocarbon such as a methane or the like and a reducing agent such as a hydrogen or the like in a plasma state, or making a plasma with the mixed gas in the container. To make a plasma with the gas, e.g., a high frequency plasma method, a microwave plasma method, or a method using both plasma methods can be used.

Where TiO$_2$ is in a form of a powder, a TiO$_2$ powder may be processed in stirring while the container is rotated. More specifically, plasma is produced by radiation of electromagnetic wave to the TiO$_2$ powder, and a carbide can be made to adhere on a surface of the particles of the powder in replacing oxygen in a lattice shape in the TiO$_2$ powder with carbon obtained from decomposition of the supplied methane by the plasma. This brings the photocatalyst of this invention in which TiC is supported at least on the surface of TiO$_2$. It is appropriate to stir the TiO$_2$ powder under a condition such that respective powder particles receive equally plasma radiation and that the powder is coated with carbide uniformly. Though depending on the reaction scale and a particle size of the powder, rotation of the container containing the TiO$_2$ powder at, e.g., a rate of 10 to 200 rounds per minute makes plasma radiated to the powder uniformly and carbide coated uniformly.

When TiO$_2$ fixed on a substrate is treated, the TiO$_2$ can be treated while the substrate is rotated so that the TiO$_2$ on the substrate is uniformly treated.

The degree of vacuum for the CVD treatment, though may vary depending on kinds of the plasma, is, e.g., in a range of 0.01 to 100 Torr, preferably, in a range of 0.1 to 10 Torr, in consideration of easiness of plasma generation and production speed of TiC.

The frequency of the electromagnetic wave to be radiated can be selected in consideration of the kinds of used hydrocarbons, properties of the supported TiC, and so on, and for example, the frequency is in a range of 1 MHz to 10 GHz. When methane is used as a hydrocarbon, it is appropriate to set the frequency of the electromagnetic wave in a range of 10 MHz to 4 GHz from a viewpoint for obtaining the coating of TiC upon decomposing methane with good efficiency. Particularly, it is preferable to use a microwave and a high frequency wave as the electromagnetic wave.

There is a certain relation among the output of the electromagnetic wave, an amount of the supported TiC, and the properties of $TiO_2$. $TiO_2$ has a tendency to transform into the rutile type within a relatively short period before the TiC supported amount becomes enough, where the output of the electromagnetic wave is too large even if the anatase type $TiO_2$ is used as a raw material. Therefore, it is preferable to adjust the output of the electromagnetic wave so that a proper amount of TiC can be supported on $TiO_2$ in maintaining the anatase type.

The $TiO_2$ used for the raw material can be an anatase type, rutile type, or the like, but from a viewpoint for utilizing solar light energy, it is appropriate to use $TiO_2$ of the anatase type. The particle size of $TiO_2$ powder is preferably one of fine particles, from a viewpoint to acquire wider surface area and higher photocatalyst activity, and in consideration of easiness for handling, it is proper to set the size in a range of, e.g., 0.1 to 200 microns. $TiO_2$ is preferably one doped with bivalent or higher ions such as vanadium, chrome, tungsten, niobium, zinc, zirconia, iron, tantalum, tin, and so on from a viewpoint from acquirement of higher photoactivity.

To treat the $TiO_2$ powder in this invention, for example, an electromagnetic wave plasma heating apparatus having an equipment structure shown in FIG. 1 is used. The electromagnetic wave oscillated at and radiated from an electromagnetic wave oscillator 1 is transmitted through an isolator 2, and the output is measured at a power monitor 3. The electromagnetic wave is then transmitted to a reaction chamber 5 through a three-stab tuner 4.

A plunger 6 is provided below the reaction chamber 5. A quartz reaction tube 7 containing powders to be processed is disposed over the plunger 6. The quartz reaction tube 7 is rotatable by a stirrer 8. The interior of the quartz reaction tube 7 is vacuumed by a vacuum pump coupled to the tube by a trap 9, and a vacuum gauge 9 measures the internal pressure.

A suitable supply pipe for mixed gas is connected to the quartz reaction tube 7, and this supply pipe introduces the mixed gas of methane and hydrogen into the quartz reaction tube 7 through the supply pipe. As a suitable mixed gas, a gas that methane gas of 0.1 to 10% by volume, preferably 0.5 to 9% by volume, more preferably 1 to 8% by volume of hydrogen is mixed can be used. Methane produces TiC upon decomposition, but if the methane content is less than 0.1% by volume, the coating of TiC cannot be obtained effectively. To the contrary, when the methane content exceeds 10% by volume, the mixed gas does not have sufficient hydrogen partial pressure according to that proportion, thereby easily turning out some adverse effects from oxygen and moisture contained in the atmosphere. The methane concentration of the mixed gas can serve as a factor to control the supported amount of TiC.

The electromagnetic wave oscillator 1 generates electromagnetic wave with a frequency of 1 MHz to 10 GHz. Where the electromagnetic wave is radiated onto the $TiO_2$ powder contained in the quartz reaction tube 7, the powder is heated from the inside of the powder, thereby making active the surfaces of the powder. The methane contained in the quartz reaction tube 7 is decomposed to produce highly active carbon. This carbon forms TiC upon replacing the carbon with latticed oxygen of the $TiO_2$ powder.

The photocatalyst of the invention can decompose many things such as inorganic materials, organic material, bacteria, microorganisms, and the like in use of light including visible light.

The photocatalyst of the invention can be used as, e.g., a photocatalyst unit supported on a substrate. The substrate can be, for example, a plate article, fiber, and particle, and can be transparent, semitransparent, or not transparent. Various materials and shapes of the substrate can be selected according to usage of the photocatalyst, and a unit in which a photocatalyst layer is formed on a substrate such as a resin made, metal made, ceramic made, or glass made substrate, can serve as a photocatalyst using light of the solar light or fluorescent lamp where the unit is attached to the window glass or fluorescent lamp. Where the substrate is a wall, roof, or floor material, such a portion may have a photocatalyst function.

Figure 2:
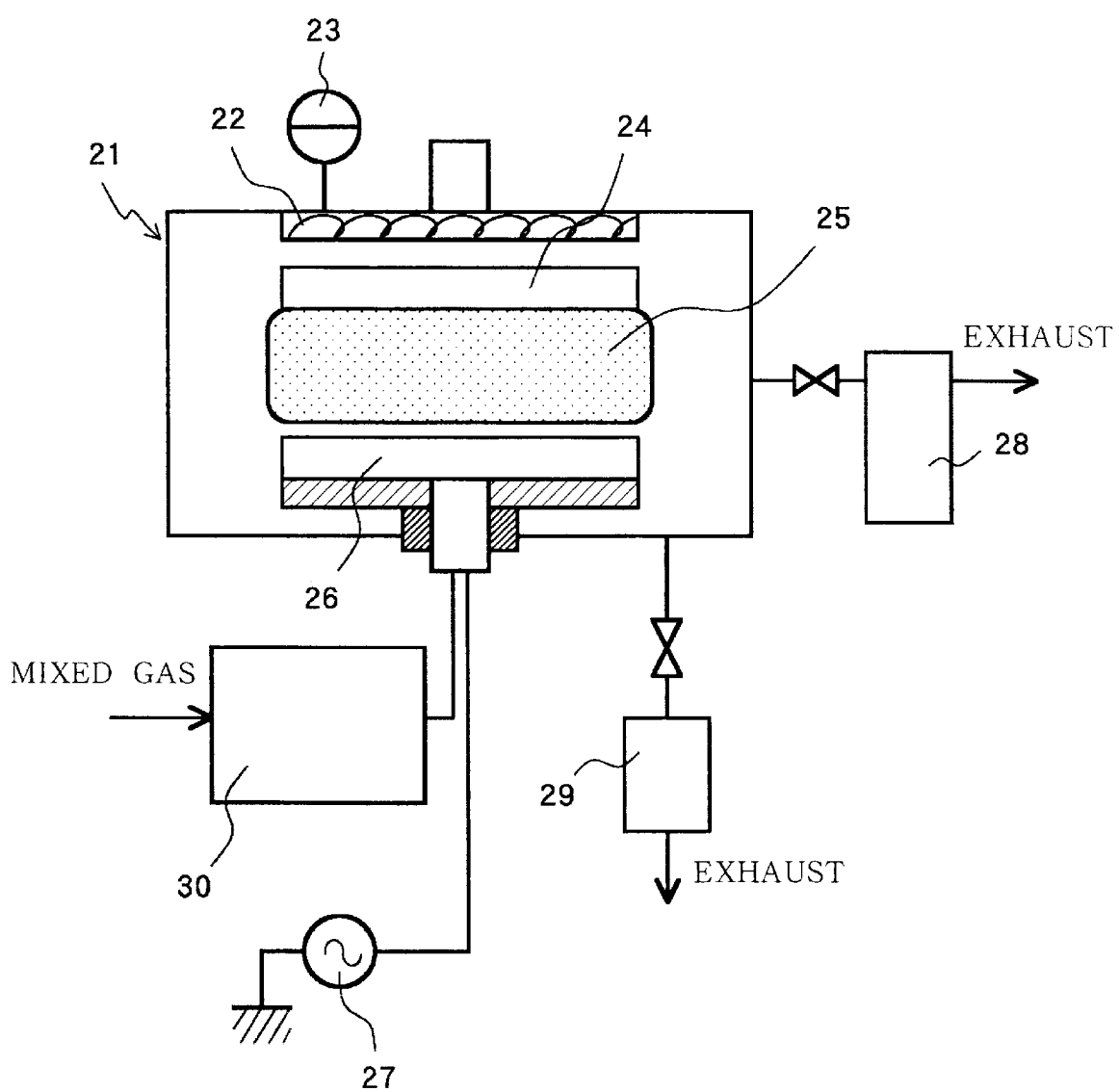
FIG. 2 is an illustration of a high frequency plasma heating apparatus used for this invention.

The photocatalyst layer can be formed on the substrate by coating, in an ordinary manner, the photocatalyst manufactured by the above method. For example, the photocatalyst is coated optionally with a proper solvent (e.g., methanol or the like) and/or binders, and the photocatalyst is then dried with heat or heated (to remove the binders and/or solvent when the binders and/or solvent is used) to manufacture the invented photocatalyst unit. Alternatively, a $TiO_2$ layer is formed on the substrate, and the substrate surface having the obtained $TiO_2$ layer is treated with a plasma CVD method in use of the mixed gas composed of the methane and hydrogen as described above to render the $TiO_2$ layer support TiC at least partially, thereby forming the photocatalyst layer on the substrate.

Where $TiO_2$ fixed on a substrate is treated in this invention, for example, a high frequency plasma apparatus having an equipment structure as shown in FIG. 2 can be used.

In a reaction chamber 21, a substrate holder 24, a heater 22 for heating the substrate holder 24, and a RF electrode 26 are arranged. A vacuum gauge 23 is provided in the reaction chamber 21, and a gas introduction system 30, and two exhaust systems 28, 29 for exhausting the gas in the chamber 21 are connected to the reaction chamber 21. The RF electrode 26 is connected to a RF power supply 27.

After the interior of the reaction chamber 27 is so exhausted to have a proper vacuum degree, the proper mixed gas is introduced from the gas introduction system 30, and plasma 25 is generated between the substrate holder 24 and the RF electrode 26 by voltage application by means of the RF power supply 27. The plasma 25 treats the substrate on the substrate holder 24.

Where light including at least visible light is radiated to the invented photocatalyst or photocatalyst unit, and where the photocatalyst or photocatalyst unit is made in contact with a material to be decomposed, the material to be decomposed can be decomposed. The radiation light includes the visible ray, and for example, it would be no problem that the light includes ultraviolet ray other than the visible ray. The photocatalyst of the invention, however, functions for photocatalyst operations even where the visible ray only is radiated. In addition to the light radiation, the catalyst functions can be improved by heating the catalyst of the invention or the catalyst layer of the invented photocatalyst unit. The heating temperature can be, e.g., in a range of 30 to 80° C.

The photocatalyst and the photocatalyst unit according to the invention is suitable for oxidizing and decomposing, particularly, organic compounds such as formaldehyde.

This invention embraces a method for decomposing formaldehyde including a step to contact the catalyst or the catalyst layer of the invention with formaldehyde while radiating light including visible ray to the catalyst of the invention or the catalyst layer of the photocatalyst unit using the photocatalyst of the invention. The light radiated includes visible ray, and there would be no problem even if the light includes ultraviolet ray other than the visible ray.

The photocatalyst of the invention can provide a photocatalytic function even where the visible ray only exists. Furthermore, in addition to the light radiation, where the catalyst of the invention or the catalyst layer of the photocatalyst unit of the invention is heated, the photodecomposition catalyst function against the formaldehyde can be improved more. The heating temperature can be in a range of about, e.g., 30 to 80° C.

This invention also includes an apparatus having the photocatalyst unit of the invention. As the apparatus including the photocatalyst unit, exemplified are a water cleaning apparatus, an air cleaning apparatus, a sterilizing apparatus, a deodorizing apparatus, an illuminating apparatus, a photoelectric cell, a photolyzing apparatus for water, and the like. Those apparatuses are known as such apparatuses including a photocatalyst, and can constitute the invented apparatus by using the photocatalyst unit of the invention.

EXAMPLES

Hereinafter, the invention is described in reference with Examples in detail.

Example 1

An anatase type titania powder of 20 to 80 meshes, 2 grams were housed in a quartz reaction tube 7 having a capacity of 200 ml. After the system interior was vacuumed by a vacuum pump, plasma was generated by a Tesla coil while electromagnetic wave (2.45 GHz) was radiated at 400 W. A $CH_4$ 1% and $H_2$ mixed gas, which was adjusted as to flow with a flow amount of 30 ml/min by a mass flowmeter as to have a prescribed mixing ratio, was introduced to create a pressure of 1 Torr, and the quartz reaction tube 7 was treated for one hour while rotated at 70 rpm. The spectrum of the generated plasma indicated production of highly active decomposed products, —CH. A powder whose surface only became gray was obtained after this treatment. It was confirmed through a fluorescent X-ray that chrome and vanadium were doped in the original anatase type titania powder.

Figure 3:
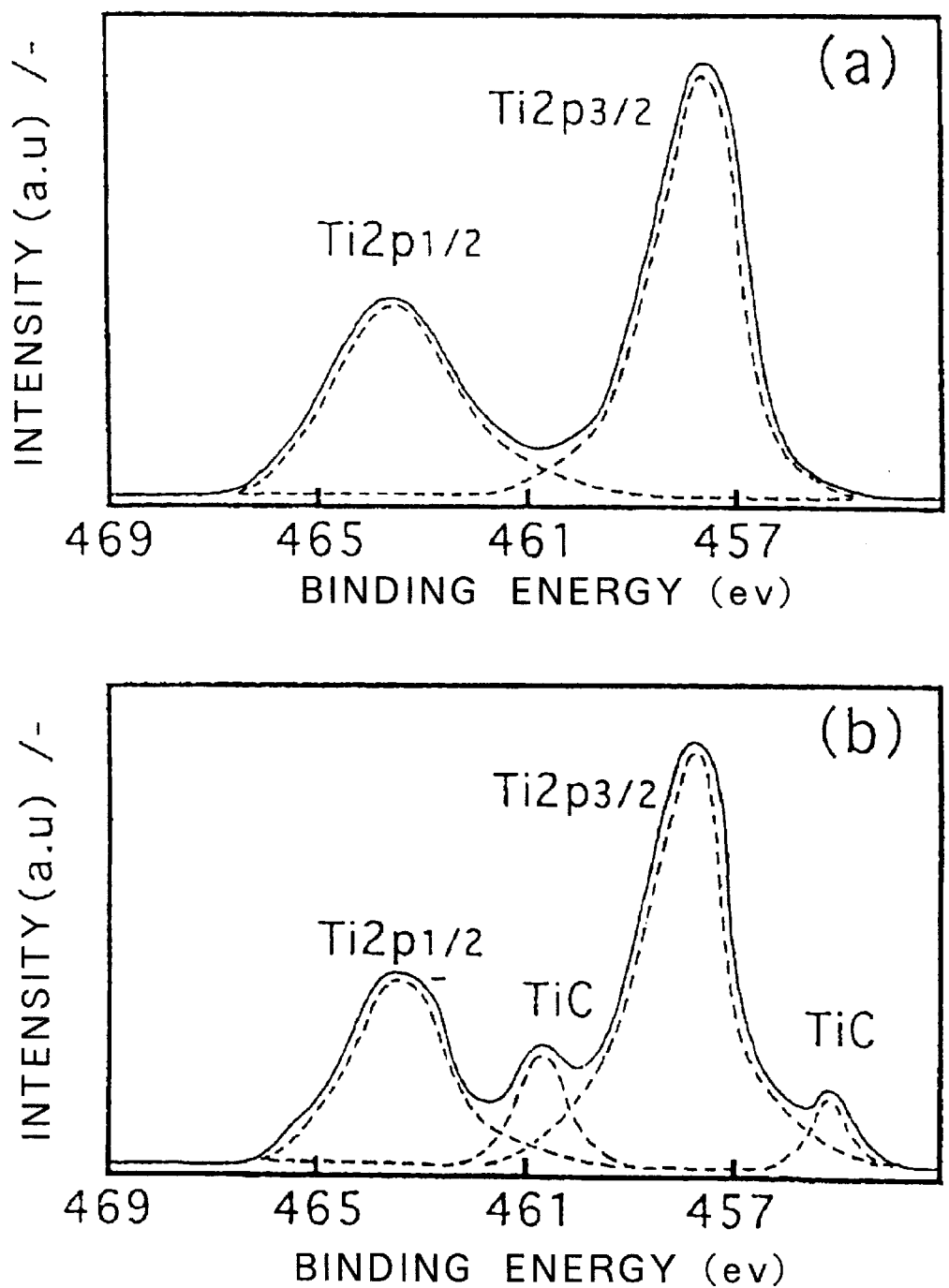
FIGS. 3(a), 3(b) are XPS spectra of titania and titanium carbide in a photocatalyst according to the invention.

FIG. 3 shows a bond energy spectrum of specimens subjected to the plasma treatment as well as to not subjected to the treatment, obtained by an X ray photoelectron spectroscopy (XPS). The X ray photoelectron spectroscopic apparatus used here was ULVAC Phi Model 1558up (X ray souce, MgKα, incident angle 30°). As a result, it was confirmed that titanium carbide, in addition to titania, was formed on the titania surface by the plasma treatment. An amount of the supported TiC was shown in which a peak height at 455 eV belonging to TiC was 25 where a peak height at 458.5 eV for bound energy of Ti2p3/2 was 100 in the above spectrum.

Figure 4:
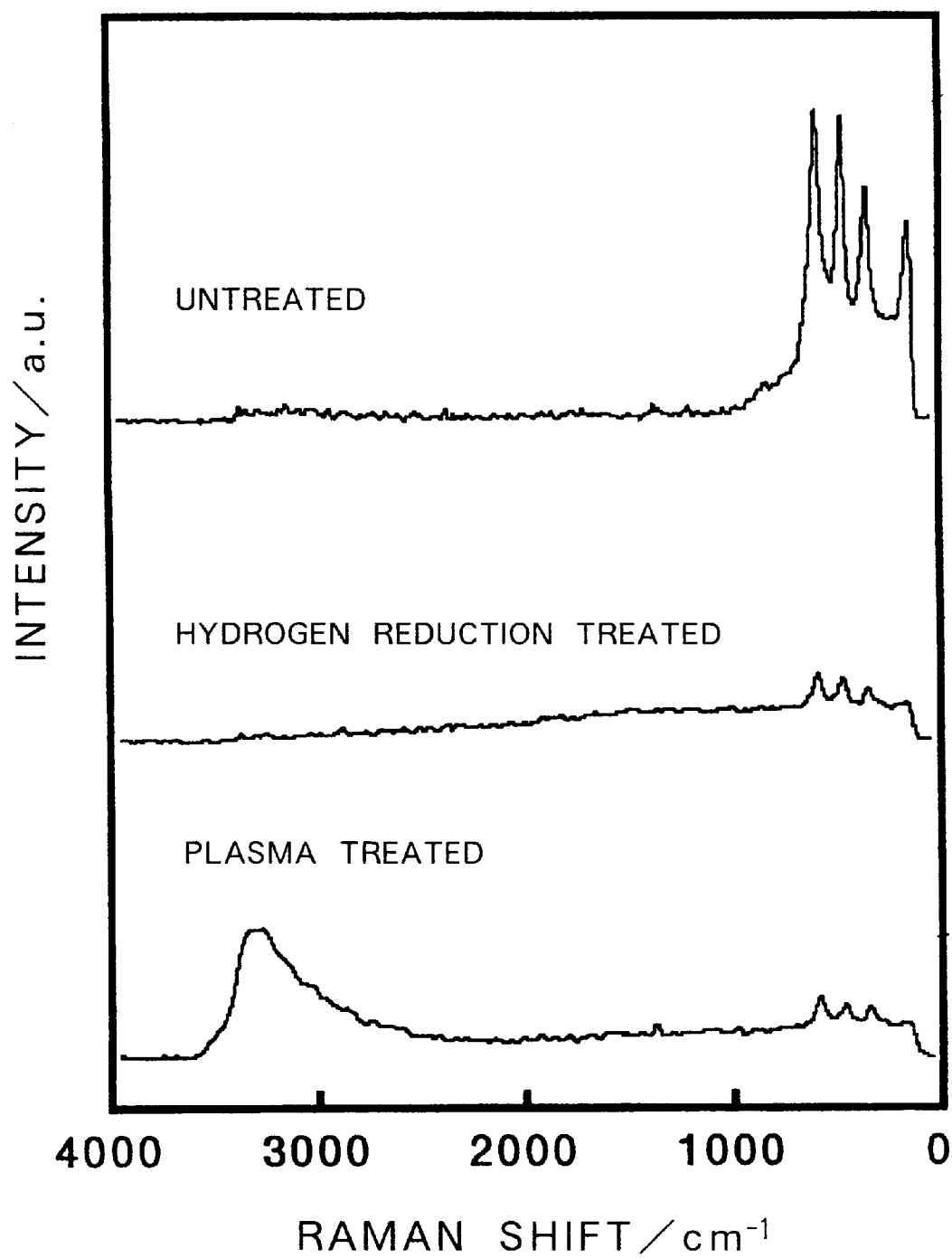
FIG. 4 is a Raman spectrum of titania, hydrogen reduced titania, and the photocatalyst according to the invention.

FIG. 4 shows a spectrum of specimens subjected to the plasma treatment, not subjected to the treatment, a hydrogen reduction treatment as a comparative reference ($H_2$ 30 ml/min, 400° C., one hour) obtained from a Raman spectroscopy. The Raman spectroscopic apparatus used here was System 2000, Perkin Elmer Co. Ltd., NIR-FT Raman. As a result, with respect to the specimen not subjected to the treatment, a Raman absorption of 0 to 1000 $cm^{-1}$ belonging to the TiO stretching vibration and the O—Ti—O bending vibration was observed, and with respect to the specimens subjected to the hydrogen reduction treatment and the plasma treatment, the same absorption was reduced greatly. The Raman absorption of 0 to 1000 $cm^{-1}$ belonging to the TiO stretching vibration and the O—Ti—O bending vibration was stable on the time basis (no change after storage in air for six months) with respect to the specimens subjecting to the plasma treatment, but with respect to a specimen subjected to the hydrogen reduction treatment, there was a tendency to return to the original peak upon quick change as time passes, and where left in air for a day, the specimen had a peak of about 50% of that of the specimen not subjected to the treatment. The specimen treated in plasma was observed with a Raman absorption of 3000 to 3500 $cm^{-1}$, whereas the same absorption was not observed in the specimen subjected to the hydrogen reduction treatment.

Examples 2 to 4

An anatase type titania powder was treated in plasma in the same manner as in Example 1 except the electromagnetic wave was changed at 200 W(Example 2), 300 W(Example 3), and 500 W(Example 4), and powders were obtained whose surface only turned into gray.

The follow table shows the TiC supported amounts obtained through the XPS spectrum.

TABLE 1

| Example No. | Electromagnetic Wave Output | Peak Height at 458.5 eV | TiC Supported Amount at Peak Height at 455 eV |
| --- | --- | --- | --- |
| 2 | 200 W | 100 | 4.0 |
| 3 | 300 W | 100 | 12 |
| 1 | 400 W | 100 | 25 |
| 4 | 500 W | 100 | 37 |

The powders obtained in Examples 1 to 4 were examined through a DTA-TGA analysis. A heat generation in a region exceeding 700° C. in the differential thermal analysis (DTA), through slight, was observed in the specimen of Example 2, the heat generation peaks per unit weight of the specimen became larger in the order of Example 3, Example 1, and Example 4. Increased weight at a temperature exceeding 500° C. in the thermal gravimetric analysis (TGA) was slight in Example 2 but was observed to become larger per unit weight of the specimen in the order of Example 3, Example 1, and Example 4.

Example 5

(Preparation of a Photocatalyst Unit, Vol. 1)

The photocatalyst obtained in Example 1 was made in a paste form with methanol, and this paste was coated on a glass substrate of 60×60 mm in an amount corresponding to 0.2 g of the photocatalyst and heated for one hour in an electric furnace at 300° C. (in air atmosphere) to obtain a photocatalyst unit of the invention.

Example 6

(Decomposition Test of Formaldehyde by Visible Light)

A glass made bell jar type reaction apparatus (having a volume of 1.9 liters) was used; the inside of the system was agitated by a fan; the substrate temperature of the photocatalyst unit produced in Example 5 was kept at 30° C. by a heater. A halogen lamp (Toshiba Litec Co. Ltd made, Neroharo-cool-minisoft (tradename)) cutting off ultraviolet ray was used as a light source, and light in a wavelength range of 400 to 800 nm through a glass filter (Toshiba Litec Co. Ltd made, IRA-25S) cutting off heat ray was radiated.

Figure 5:
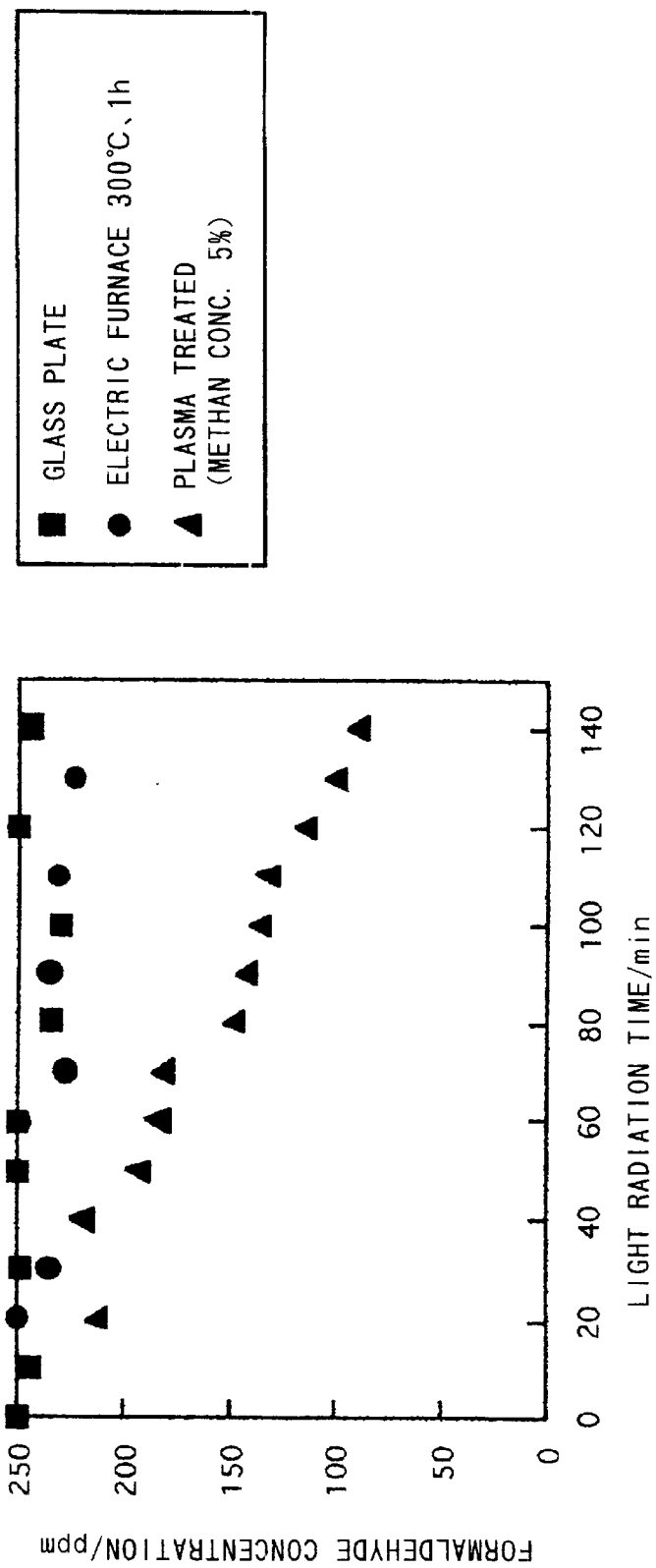
FIG. 5 is a graph showing relation between light radiation time and formaldehyde concentration in Example 6.

After the system interior was sufficiently vacuumed, formaldehyde was brought in the reaction apparatus, and a reaction gas having a prescribed concentration (250 ppm) was made. After the formaldehyde reached absorption equilibrium, light radiation began. The reaction gas was analyzed by gas chromatography (FID) upon passing through a methanizer. FIG. 5 shows relation between light radiation period and formaldehyde concentration. In FIG. 5, each black triangle denotes the results of this Example. This shows that the formaldehyde concentration reduces as time for light radiation passes, and it was turned out that the formaldehyde was decomposed by a function of the photocatalyst of the invention.

On the other hand, each black square indicates the results in the case where the light radiation was made to a glass plate used for the substrate in the same way as above. Each black circle indicates the results in the case where titanium oxide used as the original material was coated as it was on a glass plate in the same way as in Example 5 (without subjecting to the plasma treatment) and received the light radiation in the same way as above after activation by one hour heatingat 300° C. in an electric furnace (in air atmosphere). Each case did not reduce the formaldehyde concentration as time for light radiation passes, and this turned out that no decomposition of the formaldehyde was going on.

Example 7
(Preparation of a Photocatalyst Unit and Decomposition Test of Formaldehyde by Visible Light)

The photocatalysts of 0.2 g obtained in Examples 2 to 4 were coated uniformly on glass substrates of 60×60 mm and heated for one hour at 300° C. in an electric furnace (in air atmosphere), thereby making the photocatalyst units of the invention. The formaldehyde decomposition test was performed using these photocatalyst units in the same way as in Example 6. The same results were obtained as in Example 6 though there was a difference in the formaldehyde rate.

Example 8
(Decomposition Test of Tobacco Tar by Visible Light)

Tar produced by burning a tobacco was solved in water to produce a material to be decomposed. This tar aqueous solution of 1 ml was coated on the photocatalyst unit produced in Example 5. The substrate temperature was kept at 30° C. by the heater, and a halogen lamp (Toshiba Litec Co. Ltd made, Neroharo-cool-minisoft (tradename)) cutting off ultraviolet ray was used as a light source, and light in a wavelength range of 400 to 800 nm through a glass filter (Toshiba Litec Co. Ltd made, IRA-25S) cutting off heat ray was radiated.

As a result, the photocatalyst unit showing brown by the tar before the light radiation almost disappeared one hour later, and it was tuned out that decomposition of tar by a function of the photocatalyst of the invention was made.

For the purpose of a comparison, titanium oxide used as the original material was coated as it was on a glass plate in the same way as in Example 5 (without subjecting to the plasma treatment) and was subjected to coating of the tar aqueous solution 1 ml and the light radiation in the same way as above after activation by one hour heating at 300° C. in an electric furnace (in air atmosphere). Consequently, the brown color was unchanged one hour later after light radiation began, and it was turned out that almost no decomposition of tar progressed.

Example 9
(Preparation of a Photocatalyst Unit and Decomposition Test of Tar by Visible Light)

The photocatalysts of 0.2 g obtained in Examples 2, 3 were coated uniformly on glass substrates of 60×60 mm and heated for one hour at 300° C. in an electric furnace (in air atmosphere), thereby making the photocatalyst unit of the invention. The tar decomposition test was performed using this photocatalyst unit in the same way as in Example 6. As a result, the tar decomposition of the photocatalyst unit using the photocatalyst in Example 3 was the fastest.

Example 10
(Preparation of a Photocatalyst Unit, Vol. 2)

An anatase type titania powder of 20 to 80 meshes, 2 grams, the same as used in Example 1 were made into a paste form with methanol, and this paste was coated on a glass substrate of 60×60 mm in an amount corresponding to 0.2 g of the photocatalyst and heated for one hour in an electric furnace at 300° C. (in air atmosphere).

The substrate was set to a substrate holder in a reaction chamber in a parallel plate discharge type high frequency (RF) plasma CVD apparatus shown in FIG. 2, and the internal pressure of the reaction chamber was reduced. The substrate distance was set to 2 cm; the substrate processing temperature was set at 300° C.; and hydrogen including 1% methane was supplied in the reaction chamber at a flow rate of 30 ml/min so as to render the gas pressure 0.1 Torr. Specimens were produced in three types: processing times of 60 minutes, 90 minutes, and 120 minutes. The obtained photocatalyst units assumed brown, and the bond energy spectrums obtained through the X ray photoelectron spectroscopy (XPS) and the Raman spectrums in the same way as in Examples 1 to 4 were observed.

Example 11
(Decomposition Test of Acetaldehyde by Visible Light)

A glass made bell jar type reaction apparatus (having a volume of 1.9 liters) was used; the inside of the system was agitated by a fan; the substrate temperature of the photocatalyst unit produced in Example 10 was kept at 30° C. by a heater. A incandescent lamp having a center wavelength of 640 nm was used as a light source, and light including the visible light through a glass filler (Toshiba Litec Co. Ltd made, IRA-25S) cutting off heat ray was radiated.

Figure 6:
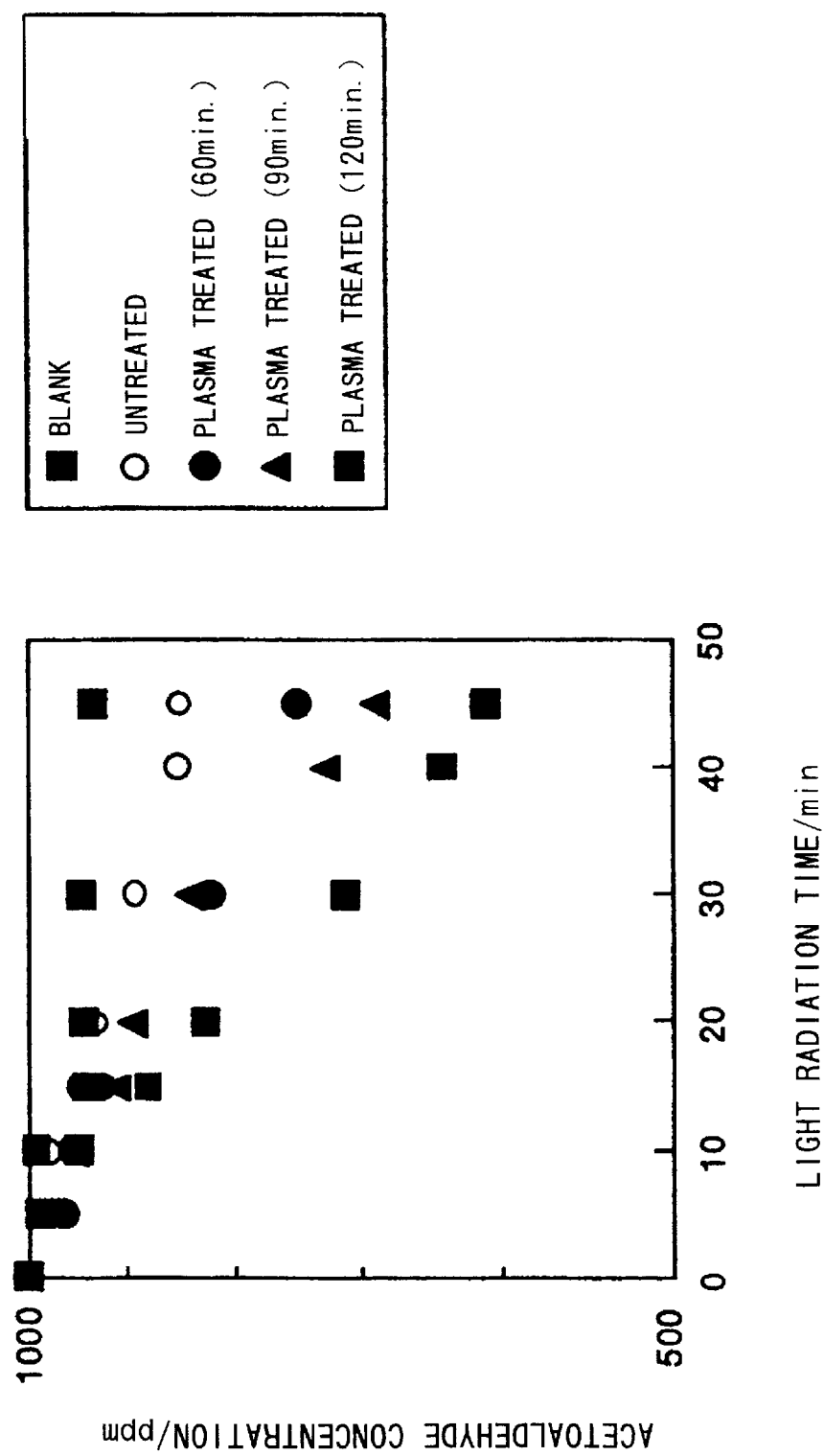
FIG. 6 is a graph showing relation between light radiation time and formaldehyde concentration in Example 11.

After the system interior was sufficiently vacuumed, acetaldehyde was brought in the reaction apparatus, and a reaction gas having a prescribed concentration (1000 ppm) was made. After the acetaldehyde reached absorption equilibrium, light radiation began. The reaction gas was analyzed by gas chromatography (FID) upon passing through a methanizer. FIG. 6 shows relation between light radiation period and acetaldehyde concentration. In FIG. 6, black circles (plasma treatment period: 60 minutes), black triangles (plasma treatment period: 90 minutes), and black squares (plasma treatment period: 120 minutes) are the results of this Example. This shows that the acetaldehyde concentration reduces as time for light radiation passes, and it was turned out that the acetaldehyde was decomposed by a function of the photocatalyst of the invention.

On the other hand, each black square indicates the results of the blank in the case where the light radiation was made to a glass plate used for the substrate in the same way as above. Each white circle indicates the results in the case where titanium oxide used as the original material was coated as it was on a glass plate in the same way as in Example 10 (without subjecting to the plasma treatment) and received the light radiation in the same way as above after activation by one hour heating at 300° C. in an electric furnace (in air atmosphere). Each case did not reduce the acetaldehyde concentration as time for light radiation passes, and this turned out that substantially no decomposition of the acetaldehyde was going on. The reason that the acetaldehyde concentration of the blank was reduced more or less is that the acetaldehyde was absorbed on inner walls or the like of the reaction apparatus.

Example 12
(Preparation of a Photocatalyst Unit, Vol. 3)

Where hydrogen including 1% methane was replaced with hydrogen excluding methane or including 10% methane, a photocatalyst unit was produced in substantially the same way as in Example 10 except the treatment period was set to 60 minutes. The photocatalyst unit obtained upon replacement with 10% methane indicated dark brown, but the photocatalyst unit produced of the hydrogen excluding methane indicated black.

Example 13
(Decomposition Test of Acetaldehyde by Visible Light)

Figure 7:
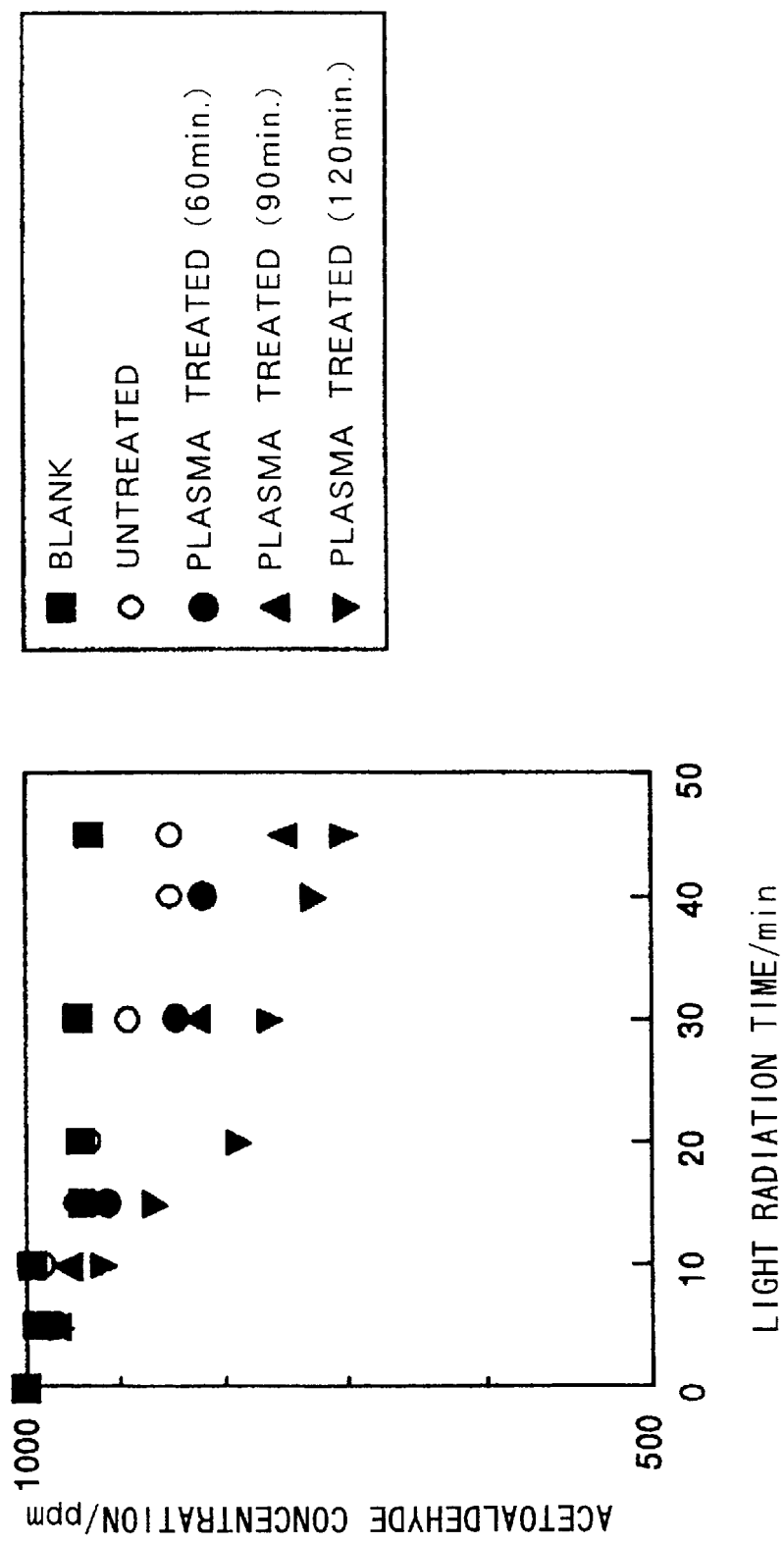
FIG. 7 is a graph showing relation between light radiation time and formaldehyde concentration in Example 13.

Acetaldehyde was subjected to photo-decomposition reactions in substantially the same manner as in Example 11. FIG. 7 shows relation between light radiation period and acetaldehyde concentration. In FIG. 7, black triangles (hydrogen including 1% methane), and black squares (hydrogen including 10% methane) are the results of this Example. This shows that the acetaldehyde concentration reduces as time for light radiation passes, and it was turned out that the acetaldehyde was decomposed by a function of the photocatalyst of the invention.

On the other hand, each black square indicates the results of the blank in the case where the light radiation was made to a glass plate used for the substrate in the same way as above. Each white circle indicates the results in the case where titanium oxide used as the original material was coated as it was on a glass plate in the same way as in Example 10 (without subjecting to the plasma treatment) and received the light radiation in the same way as above after activation by one hour heating at 300° C. in an electric furnace (in air atmosphere). Each black circle indicates the results where hydrogen excluding methane was used. Each case did not reduce the acetaldehyde concentration as time for light radiation passes, and this turned out that substantially no decomposition of the acetaldehyde was going on.

According to the invention, a novel photocatalyst that can use even visible light can be provided.

According to the invention, a photocatalyst capable of decomposing organic materials such as formaldehyde, acetaldehyde, tar, or the like, and a method for decomposing organic materials such as formaldehyde, acetaldehyde, tar, or the like in use of such a photocatalyst can also be provided.

What is claimed is:

1. A method for decomposing material comprising contacting a material to be decomposed with a photocatalyst to which light including at least visible ray is radiated, wherein said photocatalyst is that obtained by subjecting $TiO_2$ to a CVD treatment in a plasma with a mixed gas of hydrocarbon and a reducing agent.

2. The method according to claim 1, wherein the material to be decomposed is an inorganic material, organic material, bacteria, or microorganisms.

3. The method according to claim 1, wherein the photocatalyst is heated concurrently with light radiation.

4. The method according to claim 1, wherein the hydrocarbon is methane, and the reducing agent is hydrogen.

5. The method according to claim 1, wherein the $TiO_2$ is essentially of an anatase type.

6. The method according to claim 1, wherein the $TiO_2$ is doped with an element other than titanium.

7. The method according to claim 1, wherein the photocatalyst also has ultraviolet ray activity.

8. The method according to claim 1, wherein the photocatalyst is supported on a substrate.

9. A method for decomposing formaldehyde comprising contacting formaldehyde with a photocatalyst to which light including at least visible ray is radiated, wherein said photocatalyst is that obtained by subjecting $TiO_2$ to a CVD treatment in a plasma with a mixed gas of hydrocarbon and a reducing agent.

10. The method according to claim 9, wherein the hydrocarbon is methane, and the reducing agent is hydrogen.

11. The method according to claim 9, wherein the $TiO_2$ is essentially of an anatase type.

12. The method according to claim 9, wherein the $TiO_2$ is doped with an element other than titanium.

13. The method according to claim 9, wherein the photocatalyst also has ultraviolet ray activity.

14. The method according to claim 9, wherein the photocatalyst is supported on a substrate.

15. The method according to claim 9, wherein the photocatalyst is heated concurrently with light radiation.

* * * * *